United States Patent
Cohen (10) Patent No.: US 10,120,782 B2
(45) Date of Patent: *Nov. 6, 2018

(54) METHODS, DEVICES, SYSTEMS, AND NON-TRANSITORY MACHINE-READABLE MEDIUM FOR PERFORMING AN AUTOMATED CALIBRATION FOR TESTING OF A COMPUTER SOFTWARE APPLICATION

(71) Applicant: Appvance Inc., San Jose, CA (US)

(72) Inventor: Frank Cohen, Campbell, CA (US)

(73) Assignee: APPVANCE INC., San Jose, CA (US)

( * ) Notice: Subject to any disclaimer, the term of this patent is extended or adjusted under 35 U.S.C. 154(b) by 220 days.

This patent is subject to a terminal disclaimer.

(21) Appl. No.: 15/168,637

(22) Filed: May 31, 2016

(65) Prior Publication Data

US 2016/0275004 A1 Sep. 22, 2016

Related U.S. Application Data

(63) Continuation of application No. 14/789,748, filed on Jul. 1, 2015, now Pat. No. 9,361,208, which is a
(Continued)

(51) Int. Cl.
*G06F 9/44* (2018.01)
*G06F 11/36* (2006.01)

(52) U.S. Cl.
CPC ...... *G06F 11/3672* (2013.01); *G06F 11/3664* (2013.01); *G06F 11/362* (2013.01);
(Continued)

(58) Field of Classification Search
CPC ............... G06F 11/366; G06F 11/3664; G06F 11/3668; G06F 11/3684; G06F 11/3688
See application file for complete search history.

(56) References Cited

U.S. PATENT DOCUMENTS 6,002,871 A 12/1999 Duggan et al.
6,769,116 B1 7/2004 Sexton
(Continued)

FOREIGN PATENT DOCUMENTS

EP 1729213 A1 12/2006

OTHER PUBLICATIONS

Sebastian Bartholomaus et al., Improving the Concurrent Updates of Replicated Global Objects in Multi-Server Virtual Environments, DISIO, 2011, retrieved online on Aug. 27, 2018, pp. 320-327. Retrieved from the Internet<URL: http://delivery.acm.org/10.1145/2160000/2151111/p320-bartholomaus.pdf?>. (Year: 2011).*
(Continued)

*Primary Examiner* — Hanh Thi-Minh Bui
(74) *Attorney, Agent, or Firm* — Ascenda Law Group, PC (57) ABSTRACT

The present invention enables an automated testing of computer software applications for efficiently determining the quality and/or performance characteristics of the computer software applications and assists testing designers when determining software application scalability and performance under load. Embodiments of the present invention may be implemented to, for example, determine how many test servers are required to test computer software applications for correct function under the load of many concurrently active users, and periodically test and/or monitor computer software applications for quality control and/or other purposes. Additionally, embodiments of the present invention may be implemented to, for example calibrate a set of one or more test servers for testing a computer software application.

17 Claims, 8 Drawing Sheets

Related U.S. Application Data continuation of application No. 14/149,503, filed on Jan. 7, 2014, now Pat. No. 9,098,631.

(60) Provisional application No. 61/749,816, filed on Jan. 7, 2013, provisional application No. 61/749,664, filed on Jan. 7, 2013, provisional application No. 61/749,877, filed on Jan. 7, 2013.

(52) U.S. Cl.
CPC ........ *G06F 11/366* (2013.01); *G06F 11/3684* (2013.01); *G06F 11/3688* (2013.01)

(56) References Cited

U.S. PATENT DOCUMENTS

| | | |
|---|---|---|
| 6,951,011 B1 | 9/2005 | Sexton |
| 8,561,021 B2 | 10/2013 | Muharsky et al. |
| 8,631,160 B2 | 1/2014 | Joublin et al. |
| 9,009,668 B2 | 4/2015 | Pasternak |
| 9,098,631 B2 | 8/2015 | Cohen |
| 9,183,113 B2 | 11/2015 | Smiljanic et al. |
| 2003/0208351 A1 | 11/2003 | Hartman et al. |
| 2011/0296384 A1 | 12/2011 | Pasternak |
| 2015/0301925 A1 | 10/2015 | Cohen |
| 2016/0011958 A1 | 1/2016 | Smiljanic et al. |

OTHER PUBLICATIONS

Ahmed Soror et al., Automatic Virtual Machine Configuration for Database Workloads, ACM, Jun. 2008, retrieved online on Feb. 1, 2016, pp. 953-966. Retrieved from the Internet: <URL: https://cs.uwaterloo.ca/-aakssoro/pubs/soror_sigmod08.pdf>.

Austin T. Clements et al.; The Scalable Commutativity Rule: Designing Scalable Software for Multicore Processors; ACM; Jan. 2015; retrieved online on Mar. 20, 2015; pp. 1-47; Retrieved from the Internet: <URL: http://delivery.acm.org/10.1145/2700000/2699681 /a10-clements.pdf?.

Cisco Integrated Desktop Virtualization Solution; Cisco; Feb. 2013; retrieved online on Mar. 20, 2015; pp. 1-39; Retrieved from the Internet: <URL: http://www.cisco.com/c/dam/en/us/solutions/collateral/data-center-virtualization/dc-partnervmware/nexenta_ref_arch_wp_co_branded_v1c.pdf>.

Marco A. S. Netto et al.; Evaluating Load Generation in Virtualized Environment for Software Performance Testing; IEEE; 2011; retrieved online on Mar. 20, 2015; pp. 993-1000; Retrieved from the Internet: <URL: http://ieeexp lore.ieee.org/s tamp/stamp.jsp?tp=&arn umber =6008948>.

Norihiro Fjii and Nobuhiko Koike, New Virtual Remote Laboratory Environments for Logic Circuit Design Realizing an efficient sharing of Test Equipments and Concurrent User Support, IEEE, 2006, retrieved online on Feb. 1, 2016, pp. 1-6. Retrieved from the Internet: <URL: http://ieeexplore.ieee.org/stamp/stamp.jsp?tp=&arnumber=4141669>.

\* cited by examiner

METHODS, DEVICES, SYSTEMS, AND NON-TRANSITORY MACHINE-READABLE MEDIUM FOR PERFORMING AN AUTOMATED CALIBRATION FOR TESTING OF A COMPUTER SOFTWARE APPLICATION

RELATED APPLICATIONS

This application is a CONTINUATION of U.S. application Ser. No. 14/789,748 filed on Jul. 1, 2015, which is a continuation of Ser. No. 14/149,503 filed on Jan. 7, 2014, now U.S. Pat. No. 9,098,631, issued on Aug. 4, 2015, which is a non-provisional of and claims priority to U.S. Application No. 61/749,816 filed Jan. 7, 2013; U.S. Provisional Patent Application No. 61/749,664 entitled Methods, Systems, and Non-Transitory Machine-Readable Medium For Performing An Automated Testing Of A Computer Software Application filed on Jan. 7, 2013; and U.S. Provisional Patent Application No. 61/749,877 entitled Methods, Systems, and Non-Transitory Machine-Readable Medium For Performing A Web Browser To Web Browser Testing Of A Computer Software Application filed on Jan. 7, 2013, all of which are incorporated herein by reference.

FIELD OF INVENTION

The present invention relates to a method, device, system, and non-transitory machine-readable medium for determining the scale of a performance test server rapidly and automatically. The invention may be embodied in a single computer, a plurality of computers linked by a network and/or a combination or computer components.

BACKGROUND

Performance testing of a computer software application has many phases that take a long time, such as problem and success criteria definition, use case definition, test scripting, test data preparation, calibration testing, test operation, and reporting, just to name a few.

Performance tests utilize test servers to act as a client or consumer to a computer software application. The test server has finite resources, including, for example a CPU, network, memory, storage, threads, and processes. Problems can be caused by performing a test too quickly, or driving a test too hot, because the test server operating the performance test may run out of testing resources and may falsely identify performance bottlenecks in the computer software application. In this case, it is the test server that has the performance bottleneck, not the computer software application itself.

SUMMARY

Methods, devices, systems, and non-transitory machine-readable media for determining the scale of a performance test server rapidly and automatically are herein described. The invention may be embodied in a single computer, a plurality of computers linked by a network, and/or a combination or computer components.

Initially, a count of concurrently running virtual users for performing a transaction on a software application may be determined. Each virtual user included within the count may be enabled to perform the transaction during a virtual user session. At times, the determination of the count of concurrently running virtual users may be made using at least one of a default value, a value associated with a characteristic of the software application, and a value associated with a characteristic of the test server.

A test regime for testing the software application may then be determined. The test regime may include a number of series of tests and each series may include a plurality of the transactions. Each series of tests of the test regime may be performed by different a percentage of the concurrently running virtual user count.

The test regime may then be transmitted from the processor to a test server. The test server may be enabled to communicate with the computer system and execute the test regime. Test results generated by execution of the test regime may be received by the test server and analyzed to determine a level of virtual user throughput for each series of tests. The level of throughput may then be used to determine a maximum virtual user count for the test server. The maximum virtual user count may be the maximum number of virtual users the test server can employ and maintain linear scalability of throughput between the series of tests of the test regime.

A size of a set of one or more test servers used to perform the test regime while maintaining linear scalability of throughput between the series of tests of the test regime may then be determined using the maximum virtual user count. The set of test servers may be calibrated the calibration of the set of test servers to execute the test regime. Calibration of the set of test servers may include transmission of the testing regime to the set of test servers.

Optionally, test results generated by execution of the test regime may be received from the set of test servers and analyzed. The results of the analysis may be used to adjust the count of concurrently running virtual users. The adjusted count of concurrently running virtual users may then be transmitted to the test server.

In one embodiment, test results generated by execution of the test regime by the set of servers may be received and analyzed. The calibration of the set of test servers, number of series of tests, and/or the transaction may then be adjusted responsively to the analysis and the adjustments may be transmitted to the test server.

In another embodiment, a time period for executing the virtual user session by the test server may be determined prior to transmission of test regime to the test server. A time period for executing the series of tests and the test regime may then be determined based on the time period for executing the virtual user session. The test regime may then be updated to include the time period for executing the test regime and transmitted to the test server.

BRIEF DESCRIPTION OF THE DRAWINGS

The present application is illustrated by way of example, and not limitation, in the figures of the accompanying drawings, in which.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

WRITTEN DESCRIPTION

Performance testing of a computer software application may be executed to determine the error generation, scalability, functionality, and operability of the application under various conditions. One way to perform such testing is via virtual users operating on a test server to emulate the actions performed by typical human user as, for example, a client user of the software application. The test may be designed so that the virtual users execute a transaction. Performance testing has many phases that take a long time to accomplish: problem and success criteria definition, use case definition, test scripting, test data preparation, calibration testing, test operation, and reporting. A transaction is successful operation of a test use case, test suite, or test script and the results of the test may be measured in, for example, transactions per second or "TPS." A test script may be a set of a set of commands that interact with the system, software application, or service under test. A test use case is a technique that identifies test cases that exercise the whole system on a transaction by transaction basis from start to finish and a test suite is a set of test use cases Properly scaling a test of a computer software application and the test servers performing the test is time consuming. The test server has finite resources: CPU, network, memory, storage, threads, and processes.

Start a performance test too high and the test delivers results that are a function of a performance bottleneck in the test server itself and not the application under test and, in this case the test results falsely identify performance bottlenecks in the software application. Start too low and the results may not hit the upper limits of your computer software application performance and the organization operating the test pays unnecessarily for equipment not used to its potential.

With limited performance testing time available, using systems and processes described herein may enable users to more rapidly identify the optimal test levels for the application under test and avoid running levels that do not lead to actionable knowledge, thereby saving considerable resources.

The systems and methods described herein determine an optimal level of load on a test server by identifying the top most throughput in a test that achieves linear scalability while running a test on a single test server. Testers need to determine the optimal number of concurrently running transactions on a single test server first. Distributed performance test environments scale up by finding the maximum amount of load a single server generates and then runs the test across multiple test servers concurrently to reach the require level of load on the app The present invention enables an automated testing of computer software applications for efficiently determining the quality and/or performance characteristics of the computer software applications and assists testing designers when determining software application scalability and performance under load. Embodiments of the present invention may be implemented to, for example, determine how many test servers are required to test computer software applications for correct function under the load of many concurrently active users, and periodically test and/or monitor computer software applications for quality control and/or other purposes. Additionally, embodiments of the present invention may be implemented to, for example calibrate a set of one or more test servers for testing a computer software application.

Figure 1:
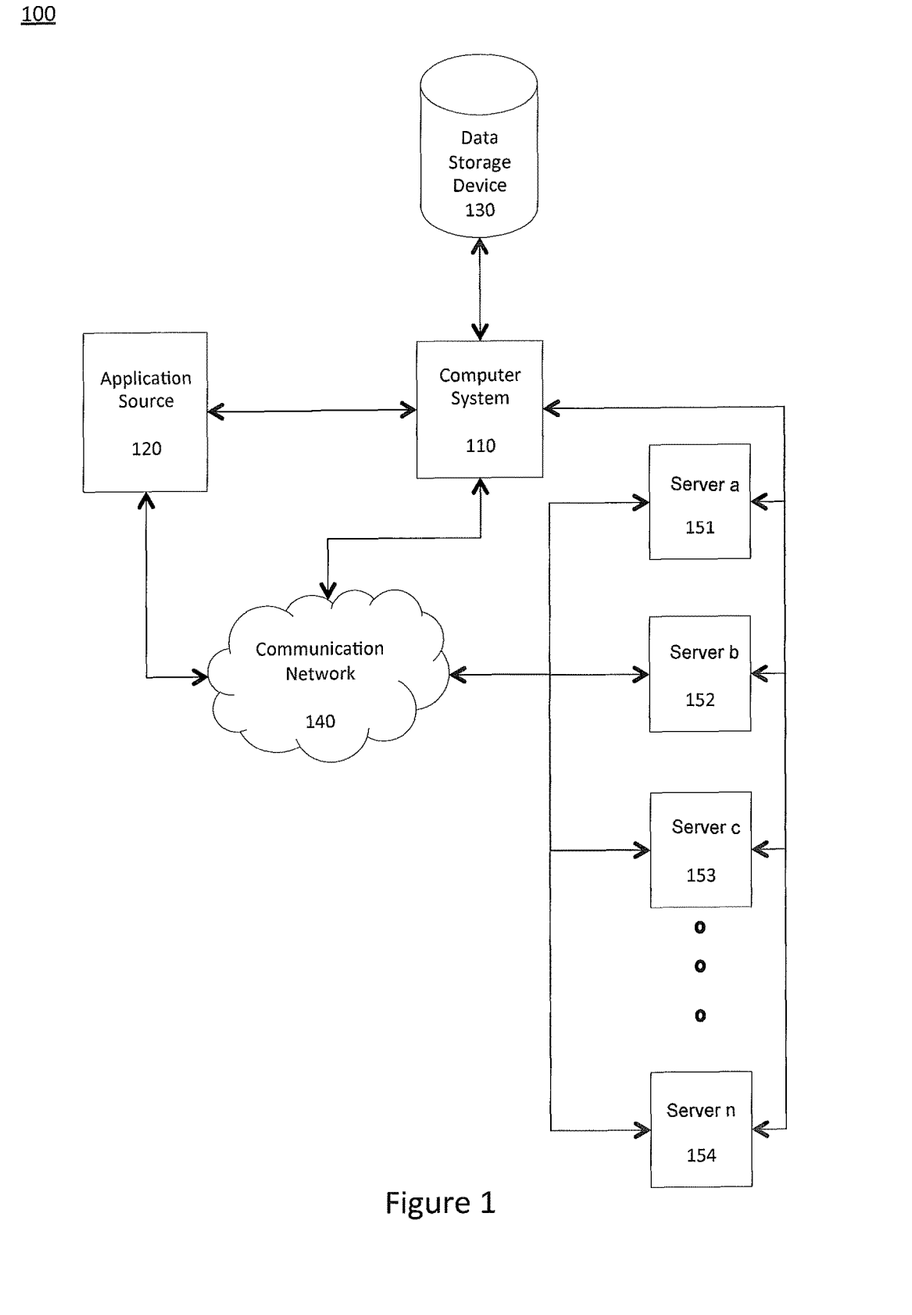
FIG. 1 is a block diagram illustrating an exemplary system for performing an automated testing of a computer software application.

Referring now to FIG. 1, an example of a system 100 including elements thereof configured to determine how many test servers are required to test a computer software and calibrate a set of one or more test servers for testing the computer software application is shown. The components of system 100 may be communicatively coupled to one another via, for example, a direct connection and/or a connection via a communication network 140. Communication network 140 may be any network enabling communication between any of the components included within system 100, such as the Internet, a local area network (LAN), a wireless local area network (WLAN), and/or any other appropriate network.

In one exemplary embodiment, a computer system 110 may receive a software application for testing from an application source 120. The software application may include a plurality of discrete sets of instructions, sometimes referred to as methods or functions, for executing one or more functionalities. Application source 120 may be any source, or combination of sources, of a software application. Exemplary application sources 120 include computers, software application users, and/or software application developers.

Computer system 110 may be configured to, determine a count of concurrently running virtual users for performing a transaction of a software application. In some instances, the count may be a default number or a number associated with a characteristic of the software application (e.g., application type, size, or intended platform for operation). Each virtual user included within the count may be configured so as to enable it to perform the transaction during a virtual user session.

Computer system 110 may be further configured to determine a test regime for testing the software application. Test regimes may include a series of tests and each series may include multiple sets of tests. Often times, each series of tests of the test regime is performed by different a percentage (e.g., 50%, 100%, and 150%) of the concurrently running virtual user count. Computer system 110 may then transmit the test regime to a test server A 151, which is able to execute the test regime and receive test results generated by execution of the test regime by the test server.

Computer system 110 may be configured to analyze the test results to determine a level of virtual user throughput for each series of tests and, using the analysis, determine a maximum virtual user count for the test server. Next, computer system 110 may determine how many test servers a-n 151-154 are required to perform the test regime while maintaining linear scalability of throughput between the series of tests of the test regime using the maximum virtual user count and calibrate the set of test servers required to execute the test regime. On some occasions, the set of test servers may include only one test server. Calibrating the set of test servers may include transmission of the testing regime to the set of test servers.

A data storage device 130 may be communicatively coupled to computer system 110. Data storage device 130 may be any data storage device, combination of data storage devices, and/or database enabled to store test results and/or a set of instructions for execution by computer system 110 and/or system 100.

Figure 2:
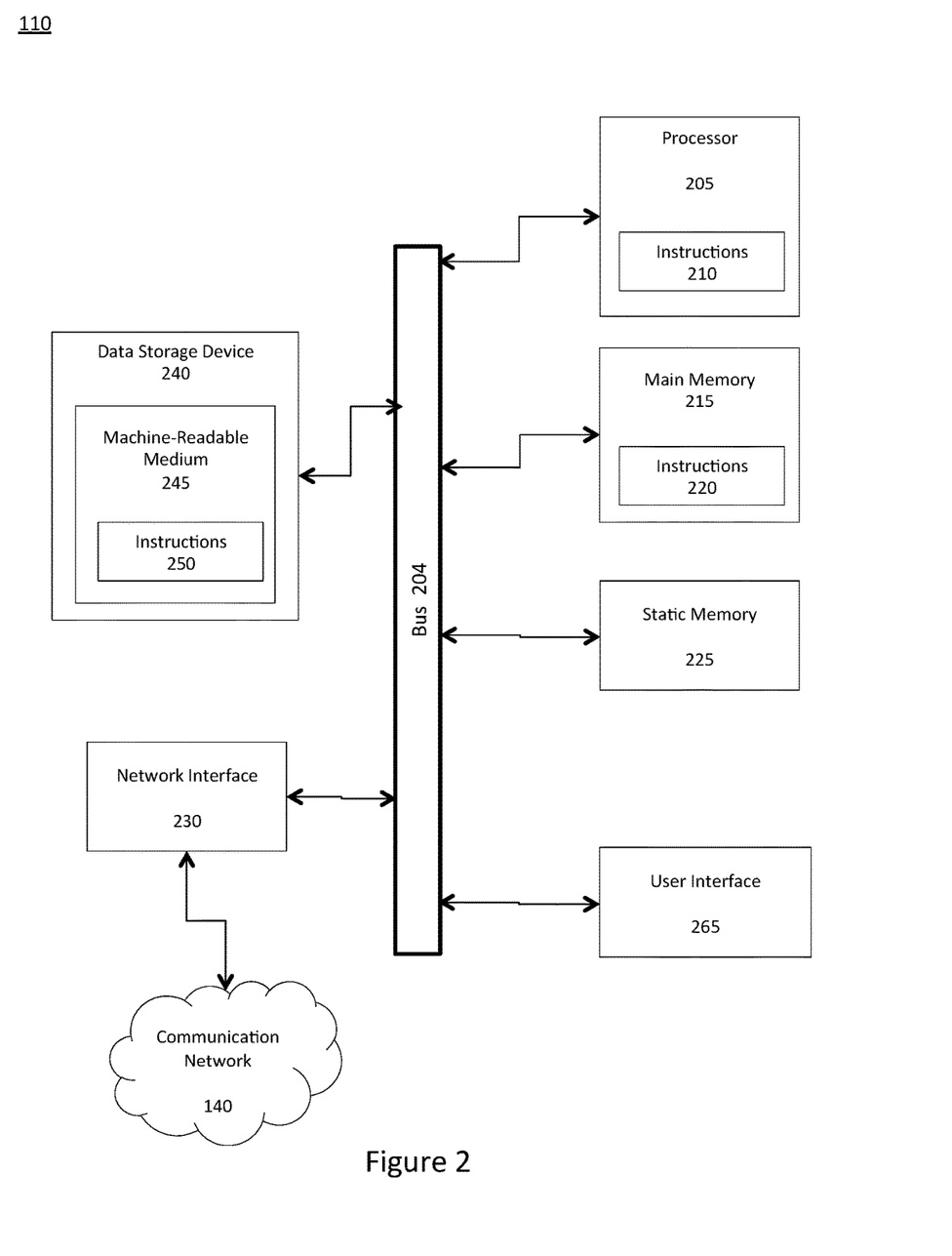
FIG. 2 is a block diagram illustrating exemplary components included within a computer system, in accordance with some embodiments of the present invention.

FIG. 2 is a block diagram illustrating one example of a computer system 110 within which a set of instructions 210, 220, and 250 for causing computer system 110 to perform any one or more of the methodologies discussed herein may be executed. In this example, components of computer system 110 are coupled directly, or indirectly, to a communication bus 204, although in other cases layers of busses or, indeed, different busses or other communication paths may be used to communicatively couple the various components of this device. Therefore, it should be appreciated that the example shown in FIG. 2 is intended only as one possible computer system configuration and is not intended to limit the scope of the present invention in any way.

In alternative embodiments, computer system 110 operates as a standalone device or may be connected (e.g., communication network 140) to other machines. In a network deployment, computer system 110 may operate in the capacity of a client machine in a server-client network environment, or as a peer machine in a peer-to-peer (or distributed) network environment.

Computer system 110 includes a network interface device 230 coupled to bus 204. Network interface device 230 provides a two-way data communication path with computer system 110. For example, network interface device 230 may be a wired or wireless local area network (LAN) interface to provide a data communication connection to a compatible LAN (such as a LAN that uses an IEEE 802.11a/b/g/n communication protocol). Computer system 110 can send messages and receive data, sets of instructions, and/or content elements through network interface device 230. A user of computer system 110 may communicate with computer system 110 via user interface 265. Exemplary user interfaces 265 include a keyboard, mouse, and microphone.

Computer system 110 also includes a processor 205 (e.g., a central processing unit (CPU), a graphics processing unit (GPU), or both), a main memory 215 (e.g., read-only memory (ROM), flash memory, dynamic random access memory (DRAM) such as synchronous DRAM (SDRAM) or Rambus DRAM (RDRAM), etc.), and a static memory 225 (e.g., flash memory, static random access memory (SRAM), etc.), which communicate with each other via a bus 204 or other communication mechanism for communicating information.

Computer system 110 may further include a data storage device 240 and a main memory (e.g., RAM) 215 for storing, for example, a received software application including one or more sets of instructions 220. Data storage device 240 may include a non-transitory machine-readable storage medium 245 on which is stored one or more sets of instructions 250 (e.g., software) embodying any one or more of the methodologies or functions described herein. Set of instructions 250 as well as any received software application may also reside, completely or partially, within main memory 215 and/or within processor 205 during execution of various operations by computer system 110. In some embodiments, static memory 225 and processor 205 may also constitute non-transitory machine-readable storage media (at least in part). In some cases, set of instructions 250 may be transmitted or received over a communication network 140 via network interface device 230 as, for example, a software application or an update to a software application. In alternative embodiments, hard-wired circuitry may be used in place of, or in combination with, set of instructions 250 to implement the invention. Thus, embodiments of the invention are not limited to any specific combination of hardware circuitry and software.

While set of instructions 250 are shown in an exemplary embodiment to be on a single medium 245, the term "non-transitory machine-readable storage medium" should be taken to include a single medium or multiple media (e.g., a centralized or distributed database or data source and/or associated caches and servers) that store the one or more sets of instructions 250. The term "non-transitory machine-readable storage medium" shall also be taken to include any non-transitory medium that is capable of storing, encoding, or carrying a set of instructions for execution by computer system 110 and that cause computer system 110 to perform any one or more of the methodologies of the present invention. The term "non-transitory machine-readable storage medium" shall accordingly be taken to include, but not be limited to, solid-state memories, optical media, and magnetic media.

Figure 3:
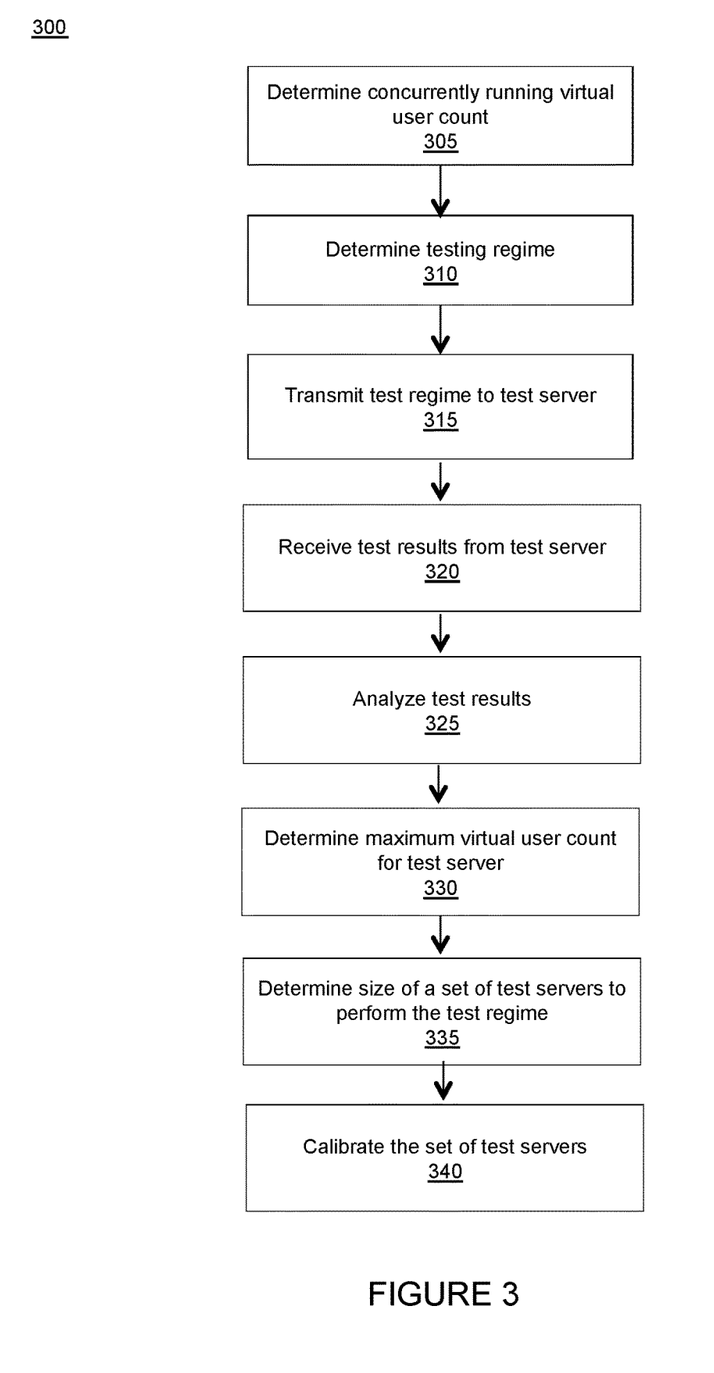
FIGS. 3-5 are flow charts depicting exemplary processes, in accordance with some embodiments of the present invention.

FIG. 3 depicts a flowchart illustrating a process 300 for determining how many test servers are required to test a computer software and calibrating a set of one or more test servers for testing the computer software application. Process 300 may be executed by any system, or system component, described herein including computer system 110.

At step 305, a count of concurrently running virtual users for performing a transaction on software application is determined. In some instances, the count may be a default number or a number associated with a characteristic of the software application (e.g., application type, size, or intended platform for operation). Each virtual user included within the count may be configured so as to enable it to perform the transaction during a virtual user session.

Next, in step 310, a test regime for testing the software application may be determined. Test regimes may include a series of tests and each series may include multiple sets of tests. Often times, each series of tests of the test regime is performed by different a percentage (e.g., 50%, 100%, and 150%) of the concurrently running virtual user count. The test regime may then be transmitted to a test server that is able to execute the test regime (step 315) and test results generated by execution of the test regime by the test server may subsequently be received (step 320).

The test results may be analyzed to determine a level of virtual user throughput for each series of tests (step 325) and, using the analysis, a maximum virtual user count for the test server may be determined (step 330). Next, it may be determined how many test servers are required to perform the test regime while maintaining linear scalability of throughput between the series of tests of the test regime using the maximum virtual user count (step 335) and the set of test servers required to execute the test regime may then be calibrated to execute the test regime (step 340). On some occasions, the set of test servers may include only one test server. The calibration of test servers may include transmission of the testing regime to the set of test servers. At times, performance of process 300 may enables software testers to rapidly identify the optimal test levels for the test servers testing the software application and avoid running levels that do not lead to actionable knowledge, thus saving valuable testing resources and time.

Figure 4:
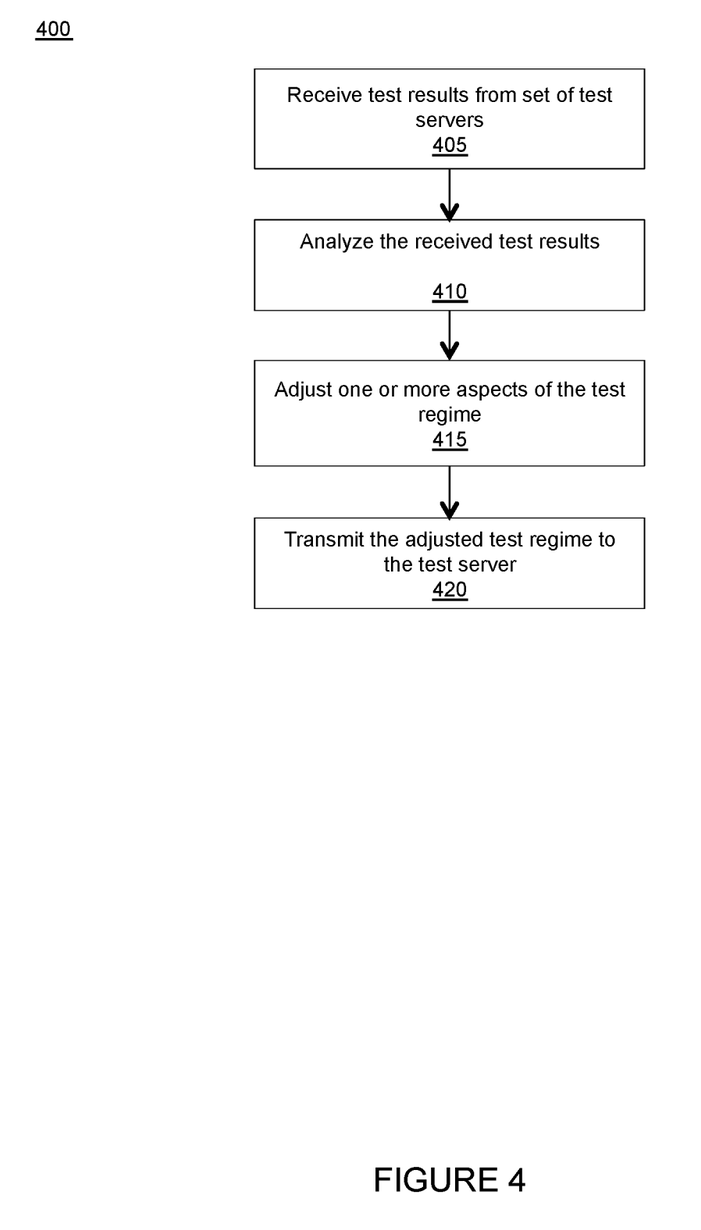

FIG. 4 depicts a flowchart illustrating a process 400 for analyzing test results generated by execution of the test regime by the set of servers from the set of test servers, adjusting the test regime accordingly, and transmitting the adjusted test regime to the set of test servers. Process 400 may be executed by any system, or system component, described herein including computer system 110.

In step 405, test results generated by execution of the test regime by the set of servers from the set of test servers may be received. The received test results are then analyzed (step 410) and one or more aspects of the test regime may be adjusted responsively to the analysis (step 415). Exemplary aspects of the test regime include the count of concurrently running virtual users, the number of series of tests, and the transaction. The adjusted test regime may then be transmitted to the test server (step 420).

Figure 5:
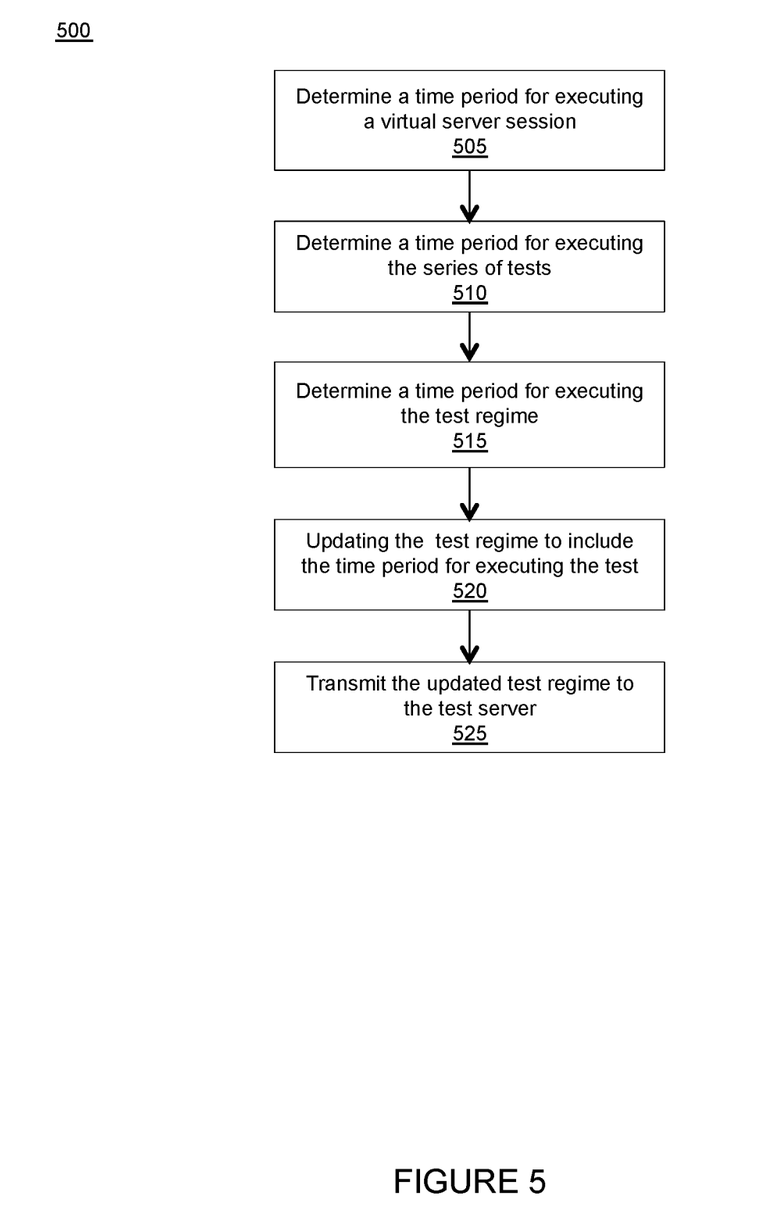

FIG. 5 depicts a flowchart illustrating a process 400 for updating a test regime. Process 500 may be executed by any system, or system component, described herein including computer system 110.

In step 505, a time period for executing the virtual user session by the test server may be determined prior to transmission of test regime to the test server. Next, a time period for executing the series of tests may be determined based on the time period for executing the virtual user session (step 510) and a time period for executing the test regime may be determined based on the time period for executing the series of tests (step 515). The test regime may then be updated to include the time period for executing the test regime (step 520) and the updated test regime may be transmitted to the test server (step 525).

Figure 6:
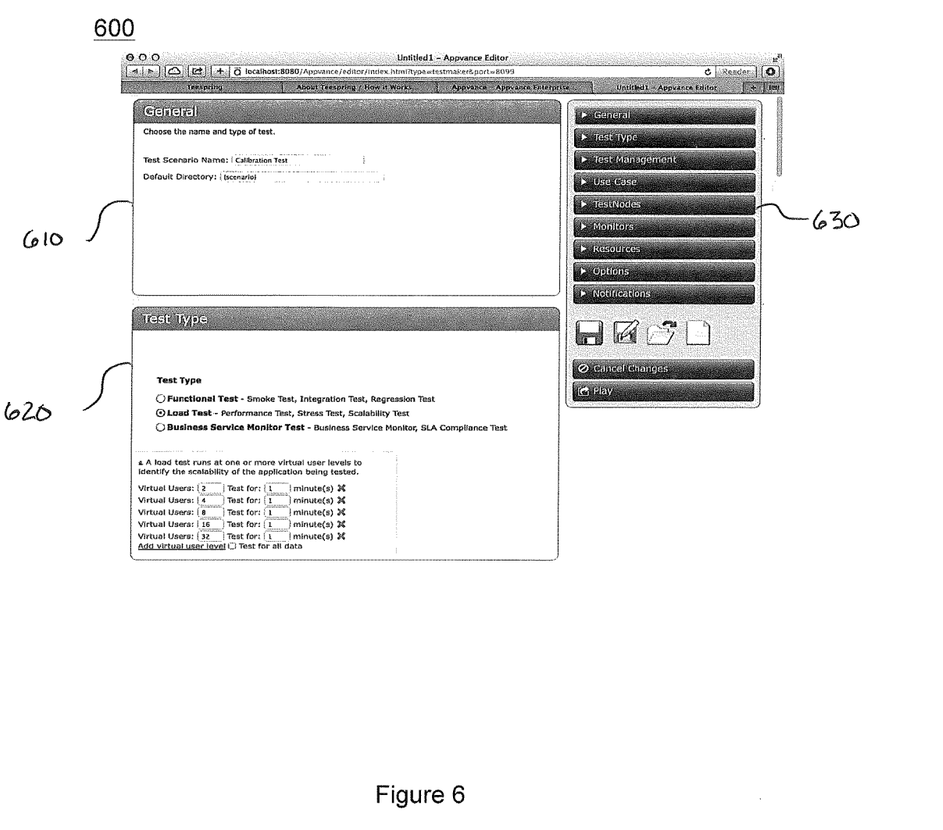
FIGS. 6-8 are graphs depicting exemplary test results, in accordance with some embodiments of the present invention.

FIG. 6 illustrates a screen shot 600 of an exemplary user interface by which a user may interact with system 100 and/or a component included therein. Screen shot 600 may be displayed by, for example, computer system 110 via any appropriate display device (e.g., LCD display). Screen shot 600 includes a general window 610, a test type window 620 and a list of menu options 630. A user may select a menu option (e.g., general, test type, test management, use case, testimonials, monitors, resources, options, notifications, cancel changes, and play) via list of menu options 630. General window 610 may enable a user to input or select test scenario name and a directory. A user may input or select, for example, a test type, a number of virtual users, and/or a duration of a test via test type window 620. On some occasions, the information provided in general window 610 and/or test type window 620 may be set by default.

Figure 7:
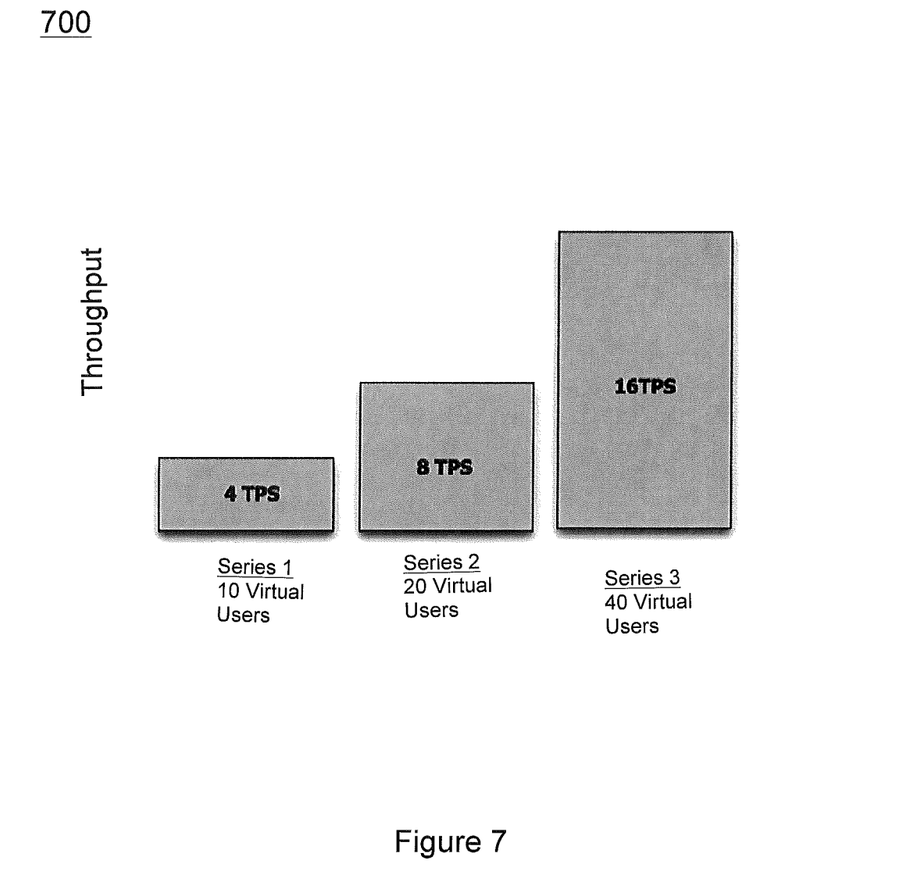

FIG. 7 illustrates a graph 700 of test results (measured as throughput in transactions per second (TPS)) for a test regime for testing a software application, wherein the count of concurrently running virtual users for performing a transaction of a software application is twenty. The test regime includes include five series of tests, labeled as series 1, series 2, and series 3. Each series is performed by a different a percentage of the concurrently running virtual user count, in this case series 1, 2, and 3 are performed by 50%, 100%, and 200% of the count, respectively. In this way, series 1 is conducted with ten virtual users, series 2 is conducted with twenty virtual users, and series 3 is conducted with forty virtual users.

The test regime of graph 700 illustrates the throughput of series 1 as 4 TPS, series 2 as eight TPS, and series 3 as sixteen TPS. Thus, the throughput for the test regime of graph 700 increases proportionally to increases in the number of virtual users conducting the tests and, as such, demonstrates linear scalability.

Figure 8:
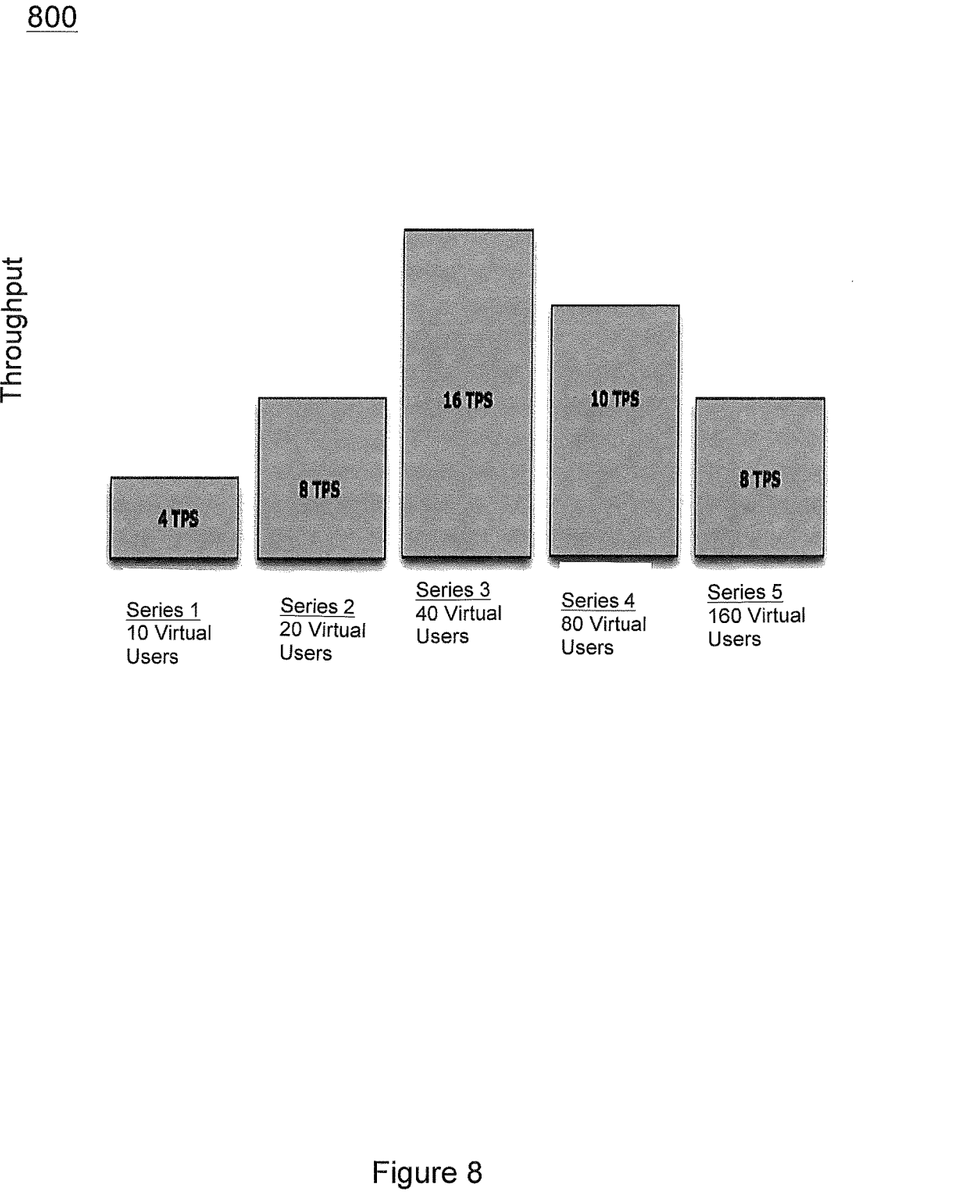

FIG. 8 illustrates a graph 800 test results (measured as throughput in transactions per second (TPS)) for a test regime for testing a software application, wherein the count of concurrently running virtual users for performing a transaction of a software application is twenty. The test regime includes include five series of tests, labeled as series 1, series 2, series 3, series 4, and series 5. Each series is performed by a different a percentage of the concurrently running virtual user count, in this case series 1, 2, 3, 4, and 5 are performed by 50%, 100%, 200%, 400%, and 800% of the count, respectively. In this way, series 1 is conducted with ten virtual users, series 2 is conducted with twenty virtual users, series 3 is conducted with forty virtual users, series 4 is conducted with eighty virtual users, and series 5 is conducted with one hundred and sixty virtual users.

The test regime of graph 800 illustrates the throughput of series 1 as 4 TPS, series 2 as eight TPS, series 3 as sixteen TPS, series 4 as ten TPS, and series 5 as eight TPS. Thus, the throughput of the test regime of graph 700 does not increase proportionally to increases in the number of virtual users conducting the tests for all of the series and, as such, demonstrates a lack of linear scalability for a count of virtual users in excess of forty. Thus, the test server failed to operate properly when 80 virtual user concurrently performed transactions on the software application. This failure can have many causes, for example, a lack of capacity of operation for the test server, backend services for the software application may have run out of network bandwidth, a database cache balancer of the application backend server may have filled, the load balancer of the application backend server may be incorrectly routing the majority of the traffic to one of the servers in a cluster of servers, or the software application may have a logical error that prevents it from performing when more than a certain number of other users are on the app.

Hence, methods, systems, and non-transitory machine-readable medium for performing an automated testing of a computer software application have been herein described.

What is claimed is:

1. A method comprising:

determining, by a computer system, a count of concurrently running virtual users for performing a transaction on a software application, wherein each virtual user included within the count is enabled to perform the transaction during a virtual user session;

determining, by the computer system, a test regime for testing the software application based on a determined count of concurrently running virtual users;

transmitting, by the computer system, the test regime from the processor to a test server, the test server being enabled to communicate with the computer system and execute the test regime;

receiving, from the test server by the computer system, a first set of test results generated by execution of the test regime by the test server; and analyzing, by the computer system, the first set of test results to determine a level of virtual user throughput for the test regime;

determining, by the computer system prior to transmission of the test regime to the test server, a time period for executing the virtual user session by the test server;

determining, by the computer system, a time period for executing a series of tests included within the test regime based on the time period for executing the virtual user session;

determining, by the computer system, a time period for executing the test regime based on the time period for executing the series of tests;

updating, by the computer system, the test regime to include the time period for executing the test regime; and transmitting, by the computer system, the updated test regime to the test server.

2. The method of claim 1, further comprising:
determining, by the computer system, a maximum virtual user count for the test server and a size of a set of one or more test servers to perform the test regime responsively to the analysis;
calibrating, by the computer system, the set of test servers required to execute the test regime, the calibration of the set of test servers including transmission of the testing regime to the set of test servers;
receiving, at the computer system, a second set of test results generated by execution of the test regime by the set of servers from the set of test servers;
analyzing, by the computer system, the received second set of test results;
adjusting, by the computer system, the count of concurrently running virtual users responsively to the analysis; and
transmitting, by the computer system, the adjusted count of concurrently running virtual users to the test server.

3. The method of claim 1, further comprising:
determining, by the computer system, a maximum virtual user count for the test server and a size of a set of one or more test servers to perform the test regime responsively to the analysis;
calibrating, by the computer system, the set of test servers required to execute the test regime, the calibration of the set of test servers including transmission of the testing regime to the set of test servers;
receiving, at the computer system, a second set of test results generated by execution of the test regime by the set of servers;
analyzing, by the computer system, the received second set of test results;
adjusting, by the computer system, the calibration of the set of test servers responsively to the analysis; and
transmitting, by the computer system, the adjusted calibration of the set of test servers to the test server.

4. The method of claim 1, further comprising:
determining, by the computer system, a maximum virtual user count for the test server and a size of a set of one or more test servers to perform the test regime responsively to the analysis;
calibrating, by the computer system, the set of test servers required to execute the test regime, the calibration of the set of test servers including transmission of the testing regime to the set of test servers;
receiving, by the computer system, a second set of test results generated by execution of the test regime by the set of test servers;
analyzing, by the computer system, the received second set of test results;
adjusting, by the computer system, the test regime responsively to the analysis; and
transmitting, by the computer system, the adjusted test regime to the test server.

5. The method of claim 1, further comprising:
determining, by the computer system, a maximum virtual user count for the test server and a size of a set of one or more test servers to perform the test regime responsively to the analysis;
calibrating, by the computer system, the set of test servers required to execute the test regime, the calibration of the set of test servers including transmission of the testing regime to the set of test servers;
receiving, by the computer system, a second set of test results generated by execution of the test regime by the set of test servers;
analyzing, by the computer system, the received second set of test results;
adjusting, by the computer system, the transaction responsively to the analysis; and
transmitting, by the computer system, the adjusted transaction to the test server.

6. The method of claim 1, wherein the determination of the count of concurrently running virtual users is made using at least one of a default value, a value associated with a characteristic of the software application, and a value associated with a characteristic of the test server.

7. The method of claim 1, further comprising:
determining, by the computer system, a maximum virtual user count for the test server and a size of a set of one or more test servers to perform the test regime responsively to the analysis; and
calibrating, by the computer system, the set of test servers required to execute the test regime, the calibration of the set of test servers including transmission of the testing regime to the set of test servers.

8. A system comprising:
a hardware processor configured to determine a count of concurrently running virtual users for performing a transaction on software application, wherein each virtual user included within the count is enabled to perform the transaction during a virtual user session, determine a test regime for testing the software application, transmit the test regime from the processor to a test server, receive a first set of test results generated by execution of the test regime by the test server, and analyze the first set of test results to determine a level of virtual user throughput for the test regime, determine a maximum virtual user count for the test server responsively to the analysis;
the test server communicatively coupled to the hardware processor via a communication device, the test server being configured to receive the test regime from the hardware processor, execute the test regime, and transmit the first set of test results to the hardware processor; and
the communication device communicatively coupled to the hardware processor and test server, the communication device being configured to facilitate communication between the hardware processor and the test server;
wherein the hardware processor is further configured to determine a size of a set of one or more test servers to perform the test regime, calibrate the set of test servers required to execute the test regime, the calibration of the set of test servers including transmission of the testing regime to the set of test servers receive a second set of test results generated by execution of the test regime by the set of servers from the set of test servers, receipt of a second set of test results generated by execution of the test regime by the set of servers, analysis of the received second set of test results, adjustment of the transaction responsively to the analysis, and transmission of the adjusted transaction to the test server and the test server is further configured to generate the second set of test results, transmit the second set of test results to the hardware processor and receive the adjusted transaction from the hardware processor.

9. The system of claim 8, wherein the hardware processor is further configured to determine how many test servers to include in a set of one or more test servers to perform the test regime, calibrate the set of test servers required to execute the test regime, the calibration of the set of test servers including transmission of the testing regime to the set of test servers, receipt of a second set of test results generated by execution of the test regime by the set of servers from the set of test servers, analysis of the received second set of test results, adjustment of the count of concurrently running virtual users responsively to the analysis, and transmission of the adjusted count of concurrently running virtual users to the test server and the test server is further configured to generate the second set of test results, transmit the second set of test results to the hardware processor, and receive the adjusted count of concurrently running virtual users from the hardware processor.

10. The system of claim 8, wherein the hardware processor is further configured to determine how many test servers to include in a set of one or more test servers to perform the test regime, calibrate the set of test servers required to execute the test regime, the calibration of the set of test servers including transmission of the testing regime to the set of test servers, receipt of a second set of test results generated by execution of the test regime by the set of servers, analysis of the received second set of test results, adjustment of the calibration of the set of test servers responsively to the analysis, and transmission of the adjusted calibration of the set of test servers to the test server, and the test server is further configured to generate the second set of test results, transmit the second set of test results to the hardware processor and receive the adjusted calibration of the set of test servers from the hardware processor.

11. The system of claim 8, wherein the hardware processor is further configured to determine how many test servers to include in a set of one or more test servers to perform the test regime, calibrate the set of test servers required to execute the test regime, the calibration of the set of test servers including transmission of the testing regime to the set of test servers, receipt of a second set of test results generated by execution of the test regime by the set of servers from the set of test servers, receipt of a second set of test results generated by execution of the test regime by the set of servers, analysis of the received second set of test results, adjustment of the test regime responsively to the analysis, and transmission of the adjusted test regime to the test server, and the test server is further configured to generate the second set of test results, transmit the second set of test results to the hardware processor and receive an adjusted test regime to the test server from the hardware processor.

12. The system of claim 8, wherein the hardware processor is further configured to determine a size of a set of one or more test servers to perform the test regime, calibrate the set of test servers required to execute the test regime, the calibration of the set of test servers including transmission of the testing regime to the set of test servers receive a second set of test results generated by execution of the test regime by the set of servers from the set of test servers, receipt of a second set of test results generated by execution of the test regime by the set of servers, analysis of the received second set of test results, adjustment of adjust the transaction responsively to the analysis, and transmission of the adjusted transaction to the test server, and the test server is further configured to generate the second set of test results, transmit the second set of test results to the hardware processor, and receive the adjusted transaction from the hardware processor.

13. A tangible non-transitory computer-readable media configured to store a set of instructions, which when executed by a hardware processor cause the hardware processor to:
 determine a count of concurrently running virtual users for performing a transaction on software application, wherein each virtual user included within the count is enabled to perform the transaction during a virtual user session;
 determine a test regime for testing the software application based on a determined count of concurrently running virtual users;
 transmit the test regime from the processor to a test server, the test server being enabled to communicate with the hardware processor and execute the test regime;
 receive, from the test server, a first set of test results generated by execution of the test regime by the test server; and
 analyze the first set of test results to determine a level of virtual user throughput for the test regime;
 determine, prior to transmission of the test regime to the test server, a time period for executing the virtual user session by the test server;
 determine a time period for executing a series of tests included in the test regime based on the time period for executing the virtual user session;
 determine a time period for executing the test regime based on the time period for executing the series of tests;
 updating the test regime to include the time period for executing the test regime; and
 transmit the updated test regime to the test server.

14. The tangible non-transitory computer-readable media of claim 13, wherein the set of instructions, when executed by the hardware processer further cause the hardware processor to:
 determine a maximum virtual user count for the test server and how many test servers to include in a set of one or more test servers to perform the test regime responsively to the analysis;
 calibrate the set of test servers required to execute the test regime, the calibration of the set of test servers including transmission of the testing regime to the set of test servers;
 receive a second set of test results generated by execution of the test regime by the set of servers from the set of test servers;
 analyze the received second set of test results;
 adjust the count of concurrently running virtual users responsively to the analysis; and
 transmit the adjusted count of concurrently running virtual users to the test server.

15. The tangible non-transitory computer-readable media of claim 13, wherein the set of instructions, when executed by the hardware processer further cause the hardware processor to:
 determine a maximum virtual user count for the test server and how many test servers to include in a set of one or more test servers to perform the test regime responsively to the analysis;
 calibrate the set of test servers required to execute the test regime, the calibration of the set of test servers including transmission of the testing regime to the set of test servers;
 receive a second set of test results generated by execution of the test regime by the set of servers from the set of test servers;

analyze the received second set of test results;

adjust the test regime responsively to the analysis; and transmit the adjusted test regime to the test server.

16. The tangible non-transitory computer-readable media of claim 13, wherein the set of instructions, when executed by the hardware processer further cause the hardware processor to:

determine a maximum virtual user count for the test server and determine how many test servers to include in a set of one or more test servers to perform the test regime responsively to the analysis;

calibrate the set of test servers required to execute the test regime, the calibration of the set of test servers including transmission of the testing regime to the set of test servers;

receive a second set of test results generated by execution of the test regime by the set of test servers from the set of test servers;

analyze the received second set of test results;

adjust the transaction responsively to the analysis; and transmit the adjusted transaction to the test server.

17. The tangible non-transitory computer-readable media of claim 13, wherein the set of instructions, when executed by the hardware processer further cause the hardware processor to:

determine a maximum virtual user count for the test server and determine how many test servers to include in a set of one or more test servers to perform the test regime responsively to the analysis;

calibrate the set of test servers required to execute the test regime, the calibration of the set of test servers including transmission of the testing regime to the set of test servers.

* * * * *